(12) United States Patent
Liu et al.

(10) Patent No.: US 9,857,799 B2
(45) Date of Patent: Jan. 2, 2018

(54) COMPUTER VISION POSITIONING SYSTEM AND METHOD FOR THE SAME

(71) Applicant: HON HAI PRECISION INDUSTRY CO., LTD., New Taipei (TW)

(72) Inventors: Tien-Ping Liu, New Taipei (TW); Horng-Juing Lee, New Taipei (TW); I-Hao Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/191,959

(22) Filed: Jun. 24, 2016

(65) Prior Publication Data

US 2017/0212520 A1 Jul. 27, 2017

(30) Foreign Application Priority Data

Jan. 27, 2016 (TW) .............................. 105102450 A

(51) Int. Cl.
*G05D 1/00* (2006.01)
*G06K 7/00* (2006.01)
*G05D 1/02* (2006.01)
*G06K 7/14* (2006.01)
*G06K 7/10* (2006.01)

(52) U.S. Cl.
CPC ....... *G05D 1/0234* (2013.01); *G06K 7/10722* (2013.01); *G06K 7/1417* (2013.01)

(58) Field of Classification Search
CPC .............................. G05D 1/00; G05D 1/0234
See application file for complete search history.

(56) References Cited

U.S. PATENT DOCUMENTS 9,031,809 B1 * 5/2015 Kumar ................. G01C 21/165
702/150
9,286,810 B2 * 3/2016 Eade .................... G09B 29/007

* cited by examiner

*Primary Examiner* — Yonel Beaulieu
(74) *Attorney, Agent, or Firm* — Steven Reiss

(57) ABSTRACT

A computer vision positioning system for a computer-controlled autonomous mobile transportation device in a warehouse for example comprises an image collection module, an artificial marker identification module, a two-dimensional code identification module, a data storage module, and a control module. The image collection module collects images, and transmits the images to the artificial marker identification module and the two-dimensional code identification module. The artificial marker identification module reads an ID of the artificial marker. The two-dimensional code identification module reads a URL of the artificial marker. The data storage module stores a map, a map description file, and location and object-disposal information. The control module controls a autonomous mobile device to move and make a disposal.

13 Claims, 2 Drawing Sheets applying a artificial marker and a two-dimensional code within a region which needs to be marked, wherein the artificial marker comprises a location information and the two-dimensional code comprises a disposal information

providing and releasing an autonomous mobile device having the computer vision positioning system; wherein an image collection module collects artificial marker images and two-dimensional code images, and transmits the artificial marker images and the two-dimensional code images to an artificial marker identification module and a two-dimensional code identification module; the artificial marker identification module identifies the artificial marker images, and transmits an ID of the artificial marker to a data storage module; the two-dimensional code module identifies the two-dimensional code images, and transmits a URL of the two-dimensional code to the data storage module; the data storage module determines the location information according to the ID, and obtains the disposal information according to the URL; and a control module controls the autonomous mobile device to move and make a disposal according to data in the data storage module.

FIG. 2

COMPUTER VISION POSITIONING SYSTEM AND METHOD FOR THE SAME

CROSS-REFERENCE TO RELATED APPLICATIONS

This application claims all benefits accruing under 35 U.S.C. §119 from TW Patent Application No. 105102450, filed on Jan. 27, 2016 in the TW Intellectual Property Office, the contents of which are hereby incorporated by reference.

FIELD

The subject matter herein generally relates to a computer vision positioning system and a method for the same.

BACKGROUND

In visual artificial marking positioning systems, calibrated lens are used to shoot pictures of artificial markers with fixed size and format, in order to determine a location of an autonomous mobile device, and a relative position and an angle of the autonomous mobile device, relative to the artificial markers. Currently, the location of the autonomous mobile device, and the relative position and angle of the autonomous mobile device with the artificial markers are determined by one artificial marker. However, location information and relative disposal information of the autonomous mobile device cannot be obtained only by the artificial marker.

In order to both obtain the location information and the relative disposal information by one artificial marker, it is necessary to bind the location information and the relative disposal information together in a program, which makes coding inflexible. In addition, if the relative disposal information changes, a complex and cumbersome modification of the program is required.

BRIEF DESCRIPTION OF THE DRAWING

Implementations of the present technology will now be described, by way of example only, with reference to the attached figures, wherein:

FIG. 2 is a flow chart of a computer vision positioning method according to one embodiment.

DETAILED DESCRIPTION

Figure 1:
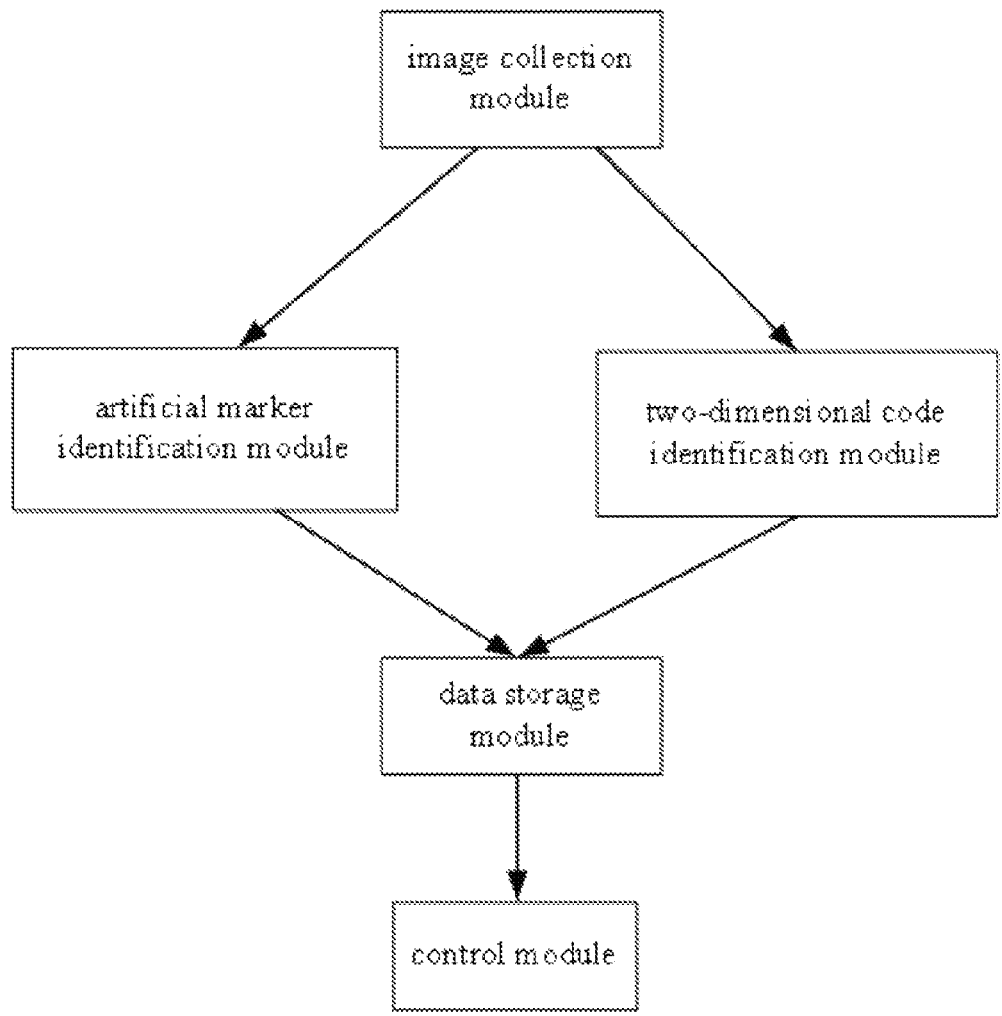
FIG. 1 is a block diagram of a computer vision positioning system according to one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, the present disclosure is described in relation to a computer vision positioning system. The computer vision positioning system comprises an image collection module, an artificial marker identification module, a two-dimensional code identification module, a data storage module, and a control module.

The image collection module is used to collect images, and transmit the images to the artificial marker identification module and the two-dimensional code identification module. The image collection module comprises a camera. The camera can be a Charge-coupled Device (CCD) or a Complementary Metal Oxide Semiconductor (CMOS) camera.

The artificial marker identification module determines which images are similar to the artificial marker. Images which are similar to the artificial marker are defined as first images. The first images are marked and identified as being the artificial markers or not. If the first images are identified as those of artificial markers, the ID of the first images are read and transmitted to the data storage module. A distance and an angle between an autonomous mobile device and the artificial markers can be calculated by the artificial marker identification module, thereby a location of the autonomous mobile device can be obtained. If the autonomous mobile device has not reached the artificial marker, the control module fine adjusts the autonomous mobile device to move into the artificial marker. If the autonomous mobile device has reached the mark marker, the control module controls the robot to not move.

The two-dimensional code identification module determines which images are similar to the two-dimensional code. The images which are determined as similar to the two-dimensional code are marked as second images. The second images are marked and identified as being the two-dimensional codes or not. If the second images are the two-dimensional codes, the URLs of the second images are read and transmitted to the data storage module.

The data storage module stores a map and a map description file marked with the artificial markers, the location information corresponding to the IDs of the artificial markers, and the disposal information obtained according to the URL of the two-dimensional codes.

The control module controls the autonomous mobile device to move and make a disposal according to data in the data storage module.

A method for the computer vision positioning system in one embodiment comprising the following steps:

S1: applying the artificial marker and the two-dimensional code within a region which needs to be marked, wherein the artificial marker comprises the location information and the two-dimensional code comprises the disposal information;

S2: providing and releasing the autonomous mobile device, wherein the image collection module collects the images of the artificial marker and the two-dimensional code, and transmits the images to the artificial marker identification module and the two-dimensional code identification module. The artificial marker identification module identifies the images of the artificial marker, and transmits the ID of the artificial marker to the data storage module. The two-dimensional code module identifies the images of the two-dimensional code, and transmits the URL of the two-dimensional code to the data storage module. The data storage module can determine the location of the autonomous mobile device according to the ID, and can obtain the disposal information according to the URL. The control module can control the autonomous mobile device to move and make a disposal according to data in the data storage module.

The artificial marker can be Tag36h11, Tag36h10, Tag25h9, or Tag16h5.

A common code of the two-dimensional code comprises Data Matrix, Maxi code, Aztec, QR code, Veri code, PDF417, Ultra code, code 49, and code 16K. The two-dimensional code can be a stack-style two-dimensional bar code or a matrix two-dimensional bar code.

The autonomous mobile device can be any mobile device such as robot or unmanned vehicle.

EXAMPLE 1

A robot moves to a destination and removes goods at the destination. The robot has the computer vision positioning system. The computer vision positioning system comprises an image collection module, an artificial marker identification module, a two-dimensional code identification module, a data storage module, and a control module.

In this example, the robot moves a machine which is on a shelf. An artificial marker "A" and a two-dimensional code "a" are located above the shelf and above the machine. The artificial marker "A" comprises location information, and the two-dimensional code "a" comprises disposal information. In the data storage module, the artificial marker "A" and the two-dimensional code "a" are endowed with different meanings by an artificial writer. The artificial marker "A" represents a location of the machine on the shelf. The two-dimensional code "a" represents non-fragile goods, which can be clamped by a normal manipulator.

Firstly, the control module controls the robot to move to the proximity of the artificial mark "A," according to a route in the map description file.

Then, the image collection module collects images with the calibrated camera lens, and transmits the images to the artificial marker identification module and the two-dimensional code identification module. The images collected by the calibrated camera lens have no distortion.

The artificial marker identification module identifies the artificial marker "A", reads the ID of the artificial marker "A", and transmits the ID to the data storage module. The distance and angle between the robot and the artificial marker "A" are calculated by the artificial marker identification module, and information that the robot has reached the mark marker "A" is anti calculated.

The two-dimensional code identification module identifies the two-dimensional code "a", reads the URL of the two-dimensional code "a", and transmits the URL of the two-dimensional code "a" to the data storage module.

The location information of the robot is obtained by the data storage module according to the ID of the artificial marker "A." The disposal information is obtained according to the URL. The location information according to the ID of the artificial marker "A" is the location of the machine on the shelf. The URL of the two-dimensional code "a" records information that the machine is non-fragile goods.

The control module controls the robot to extend a normal manipulator to take hold of and clamp the machine.

When the machine on the shelf is replaced, only the information of the URL of the two-dimensional code or the two-dimensional code needs to be modified with replacement information. Robot programs do not need to be edited or re-edited. Therefore, coding is flexible, it is not necessary to bind the location information and the relative disposal information together in a program. Processing is thus simplified.

In another example, the artificial marker and the two-dimensional code can represent other meanings.

EXAMPLE 2

A route of a robot has different terrains ground; but the robot using the system herein disclosed can go on or through different terrains smoothly.

The different terrains comprise concrete, carpet, upward-sloping route, and downward-sloping path. Since the friction coefficient of the robot is different for different terrains, the motor output should be adjusted according to the different surfaces or terrains. The robot dynamically adjusts the motor output by a method of combining the two-dimensional code and the artificial marker.

The robot has the computer vision positioning system combining artificial marker and two-dimensional code. The computer vision positioning system combining artificial marker and two-dimensional code comprises an image collection module, an artificial marker identification module, a two-dimensional code identification module, a data storage module, and a control module.

The artificial marker and the two-dimensional code are set at the starting point of a special route. The artificial marker comprises location information and the two-dimensional code comprises the disposal information. The artificial marker indicates the starting point of the special route. The two-dimensional code indicates the type of the special route and the related disposal information. In this example, an artificial marker "B" and a two-dimensional code "b" are set at the starting point of an upward-sloping route. The artificial marker "B" represents the starting point of the special route. The two-dimensional code "b" represents the special route is upward-sloping route, and the robot can determine the output of the motor to progress forward on the upward-sloping route.

Firstly, the control module controls the robot to move to the proximity of the artificial mark "B" according to a route in the map description file.

Then, the image collection module collects images with a calibrated camera lens, and transmits the images to the artificial marker identification module and the two-dimensional code identification module. The images collected by the calibrated camera lens have no distortion.

The artificial marker identification module identifies the artificial marker "B", reads the ID of the artificial marker "B", and transmits the ID to the data storage module. The distance and angle between the robot and the artificial marker "B" are calculated by the artificial marker identification module, and the location of the robot is anti calculated. The robot has not reached the mark marker "B," the control module make fine adjustments to the robot, to move it into the artificial marker.

The two-dimensional code identification module identifies and reads the two-dimensional code "b", and transmits the URL of the two-dimensional code "b" to the data storage module.

The location information of the robot is obtained by the data storage module according to the ID of the artificial marker "B". The data storage module is connected with the URL of the two-dimensional code "b", and the disposal information is obtained according to the URL. The location information according to the ID of the artificial marker "B" is the starting point of the special route. The URL of the two-dimensional code "b" indicates that the special route is upward-sloping, and the robot can determine the output of the motor to progress forward on the upward-sloping route.

The control module controls the robot to move on the upward-sloping route at a specific motor output, in order to make the progress of the robot smooth.

When the robot moves on other special routes, it can only modify the URL information of the two-dimensional code or replace the two-dimensional code. The robot program does not need to be re-edited. This coding is therefore flexible, binding the location information and the relative disposal information together in a program is avoided, which simplifies the processing.

In another example, the artificial marker and the two-dimensional code can represent other meanings.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

The above-described embodiments are intended to illustrate rather than to limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A computer vision positioning system for an autonomous mobile device comprising:
    an image collection module comprising a camera;
    an artificial marker identification module;
    a two-dimensional code identification module;
    a data storage module; and
    a control module;
    wherein the image collection module is configured to collect images using the camera, and transmit the images to the artificial marker identification module and the two-dimensional code identification module;
    the artificial marker identification module is configured to identify an artificial marker, read an ID of the artificial marker, and transmit the ID to the data storage module, wherein the artificial marker is selected from the group consisting of Tag36h11, Tag36h10, Tag25h9, and Tag16h5;
    the two-dimensional code identification module is configured to identify a two-dimensional code, read a URL of the artificial marker, and transmit the URL to the data storage module;
    the data storage module is configured to store a map and a map description file marked with the artificial marker, a location information corresponding to the ID of the artificial marker, and a processing information obtained according to the URL of the two-dimensional code; and
    the control module is configured to control the autonomous mobile device to move and make a disposal, wherein the autonomous mobile device has the computer vision positioning system.

2. The computer vision positioning system of claim 1, wherein the camera is a charge-coupled device or a complementary metal oxide semiconductor.

3. The computer vision positioning system of claim 1, wherein the camera comprises a calibrated camera lens.

4. The computer vision positioning system of claim 1, wherein a common code of the two-dimensional code is selected from the group consisting of Data Matrix, Maxi Code, Aztec, QR Code, Veri Code, PDF417, Ultra Code, Code 49, and Code 16K.

5. The computer vision positioning system of claim 1, wherein the two-dimensional code is a stack-style two-dimensional bar code.

6. The computer vision positioning system of claim 1, wherein the two-dimensional code is a matrix two-dimensional bar code.

7. A method for a computer vision positioning system for an autonomous mobile device comprising:
    step (S1): applying an artificial marker and a two-dimensional code within a region which needs to be marked, wherein the artificial marker comprises a location information and the two-dimensional code comprises a processing information, wherein a distance and an angle between the autonomous mobile device and the artificial marker are calculated by an artificial marker identification module; and the location information of the autonomous mobile device is anti calculated;
    step (S2): providing and releasing an autonomous mobile device having the computer vision positioning system; wherein an image collection module comprising a camera collects artificial marker images and two-dimensional code images, and transmits the artificial marker images and the two-dimensional code images to the artificial marker identification module and a two-dimensional code identification module; the artificial marker identification module identifies the artificial marker images, and transmits an ID of the artificial marker to a data storage module; the two-dimensional code identification module identifies the two-dimensional code images, and transmits a URL of the two-dimensional code to the data storage module; the data storage module determines the location information according to the ID, and obtains the processing information according to the URL; and a control module controls the autonomous mobile device to move and make a disposal according to data in the data storage module.

8. The method of claim 7, wherein the artificial marker identification module is configured to judge which the artificial marker images are similar to the artificial marker; when the artificial marker images are similar to the artificial marker, the artificial marker images are marked and identified whether the artificial marker images are the artificial marker.

9. The method of claim 7, wherein the autonomous mobile device has not reached the artificial marker; and the control module make fine adjustments to the autonomous mobile device, to move it into the artificial marker.

10. The method of claim 7, wherein the artificial marker is selected from the group consisting of Tag36h11, Tag36h10, Tag25h9, and Tag16h5.

11. The method of claim 7, wherein a common code of the two-dimensional code is selected from the group consisting of Data Matrix, Maxi Code, Aztec, QR Code, Veri Code, PDF417, Ultra Code, Code 49 and, Code 16K.

12. The method of claim 7, wherein the two-dimensional code is a stack-style two-dimensional bar code.

13. The method of claim 7, wherein the two-dimensional code is a matrix two-dimensional bar code.

\* \* \* \* \*